(12) United States Patent
Mimatsu

(10) Patent No.: US 8,001,327 B2
(45) Date of Patent: Aug. 16, 2011

(54) METHOD AND APPARATUS FOR MANAGING PLACEMENT OF DATA IN A TIERED STORAGE SYSTEM

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 720 days.

(21) Appl. No.: 11/656,221

(22) Filed: Jan. 19, 2007

(65) Prior Publication Data

US 2008/0177948 A1    Jul. 24, 2008

(51) Int. Cl.
*G06F 12/08* (2006.01)
(52) U.S. Cl. ........ 711/117; 711/158; 711/161; 711/162; 711/165; 714/6
(58) Field of Classification Search ................. 711/117, 711/158, 165, 161, 162; 714/6
See application file for complete search history.

(56) References Cited

U.S. PATENT DOCUMENTS

| | | | | |
|---|---|---|---|---|
| 6,681,303 | B1 * | 1/2004 | Watanabe et al. | 711/162 |
| 7,305,536 | B2 * | 12/2007 | Tabata et al. | 711/165 |
| 2004/0193760 | A1 * | 9/2004 | Matsunami et al. | 710/36 |

* cited by examiner

*Primary Examiner* — Jae U Yu
(74) *Attorney, Agent, or Firm* — Sughrue Mion, PLLC

(57) ABSTRACT

When a client access a file in a tiered storage system, the storage controller determines which tier is appropriate to store the file based on which client is accessing it and what operation is being performed. In one exemplary implementation, the tiered storage system receives a data access request corresponding to a file from the at least one client; determines the identity of the requesting client; determines an original tier of the file; determines a target tier to which the file should be migrated to; and if the original tier and the target tier are different, migrates the file from the original tier to the target tier.

19 Claims, 11 Drawing Sheets

10207

| Volume (20001) | Tier (20002) | Free Blocks (LBA) (20003) |
|---|---|---|
| 1 | 1 | 0-10, 100-120, ... |
| 2 | 1 | 1000-1100, ... |
| 3 | 2 | 3000-6000, ... |
| ... | | |

| Client ID (30001) | Tier (30002) |
|---|---|
| X | 1 |
| Y | 2 |
| Z | 2 |
| ... | |

| Path | File Name | Attributes | Tier | Used Blocks (Vol, LBA) |
|---|---|---|---|---|
| /dirA | File1.txt | ... | 1 | (Vol1, 11)<br>(Vol1, 12)<br>... |
| /dirA | . | ... | 1 | (Vol1, 121)<br>(Vol1, 122)<br>... |
| /dirB | File2.txt | ... | 2 | (Vol3, 0)<br>(Vol3, 1)<br>... |
| ... | | | | |

| File Operation ⟋50001 | Rule ⟋50002 |
|---|---|
| CREATE | CLIENT |
| WRITE | UPPER |
| MKDIR | CONSTANT (1) |
| ... | |

Fig. 5

METHOD AND APPARATUS FOR MANAGING PLACEMENT OF DATA IN A TIERED STORAGE SYSTEM

FIELD OF THE INVENTION

This invention generally relates to managing storage systems and more specifically to managing the placement of files in a tiered storage system.

DESCRIPTION OF THE RELATED ART

Today's large storage systems contain various kinds of storage devices in it, e.g., FibreChannel hard disk drives, SATA drives, and so on. Each kind of devices has different characteristics and forms a 'tier' of storage. Higher tier is expensive and appropriate to store small amount of data requiring high performance and high reliability. Lower tier is inexpensive and appropriate to store large amounts of data not requiring such high level of performance and reliability. If only expensive storage devices, that is, only a high tier is used to store all of data, the storage system will provides high performance and high reliability for all data, but the cost of the system will be high. By having multiple tiers and appropriately assigning them to various data, the system can provide necessary performance and reliability at a reasonable cost.

U.S. published patent application No. 2004/0193760, incorporated by reference herein in its entirety, discloses a storage device which migrates data among storage classes, which form storage hierarchy in a storage device. In such storage system, files are deployed in the storage hierarchy appropriately so that the storage system provides appropriate performance, reliability, and other properties for each file.

However, each client of the disclosed storage device must support non-standard protocol to send the management information. Also, because it migrates files based on elapsed time, the storage administrator must estimate appropriate residence period in each tier for each file.

Therefore, the existing technology fails to provide a method and apparatus for managing the placement of files based on information and operations obtained from clients via standard file access protocol.

SUMMARY OF THE INVENTION

The inventive methodology is directed to methods and systems that substantially obviate one or more of the above and other problems associated with conventional techniques for managing storage systems.

In accordance with one aspect of the inventive methodology, there is provided a computerized data storage system and associated method and computer software product. The Inventive data storage system includes storage resources having multiple tiers; a communication interface operable to connect the computerized data storage system to at least one client; and a storage processor. The storage processor receives a data access request corresponding to a file from the at least one client; determines the identity of the requesting client; determines an original tier of the file; determines a target tier to which the file should be migrated to; and if the original tier and the target tier are different, migrates the file from the original tier to the target tier.

In accordance with another aspect of the inventive methodology, there is provided a computer readable medium embodying a set of instructions, which, when executed by one or more processors causes the one or more processors to: receive a data access request corresponding to a file from the at least one client; determine the identity of the requesting client; determine an original tier of the file; determine a target tier to which the file should be migrated to; and if the original tier and the target tier are different, migrate the file from the original tier to the target tier.

In accordance with yet another aspect of the inventive methodology, there is provided a method involving receiving a data access request corresponding to a file from the at least one client; determining the identify of the requesting client; determining an original tier of the file; determining a target tier to which the file should be migrated to; and if the original tier and the target tier are different, migrating the file from the original tier to the target tier.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates exemplary volume table.

FIG. 3 illustrates exemplary client table.

FIG. 4 illustrates exemplary file table.

FIG. 5 illustrates exemplary migration rule.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware. The embodiments described below do not limit the scope of the patent claims of the present invention, and any features described in the embodiments can be combined arbitrarily.

1. System Structure

Figure 1:
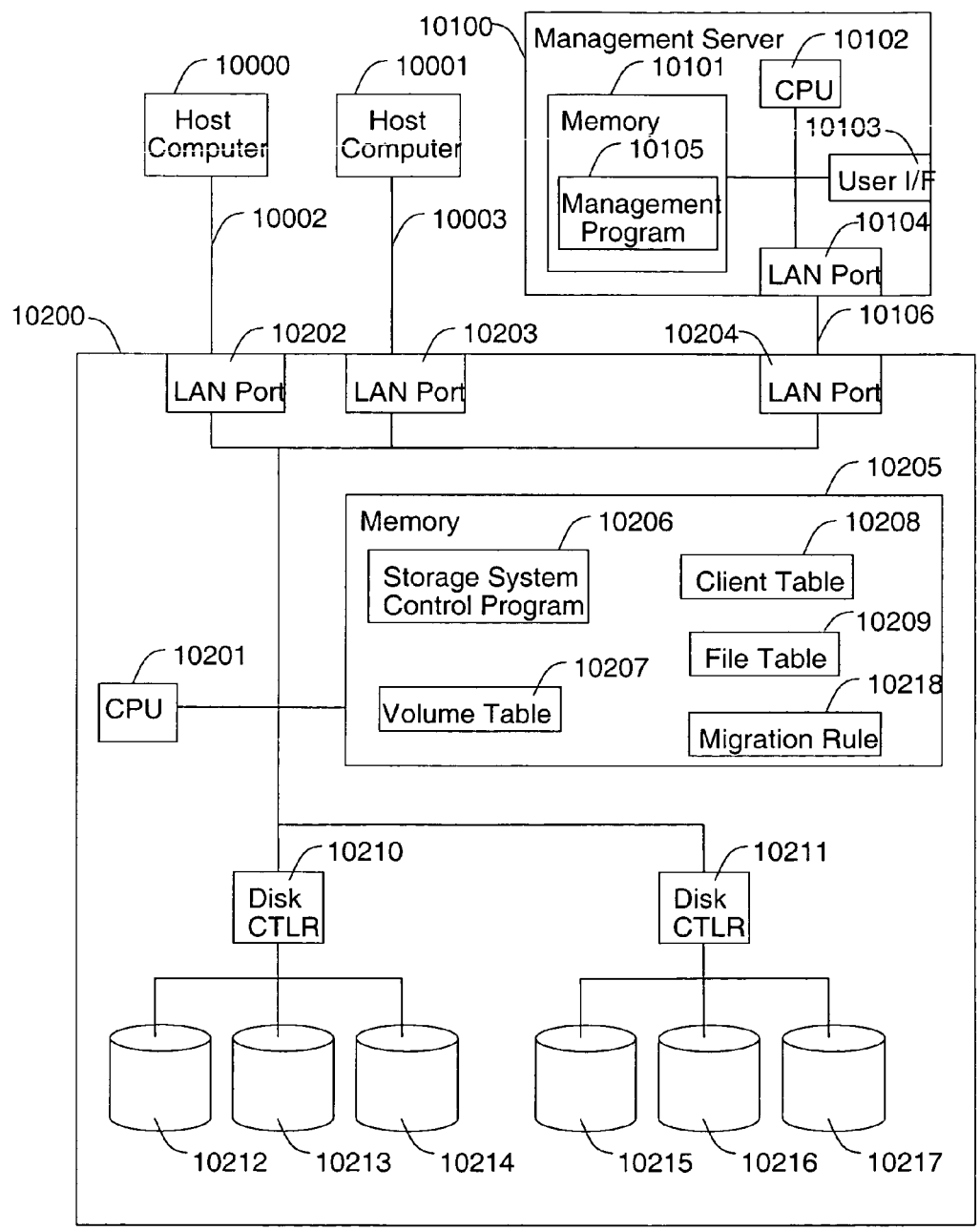
FIG. 1 shows an overview of computer storage system in which the method and apparatus of this invention applied.

FIG. 1 shows an overview of computer storage system in which the method and apparatus of this invention applied.

(1) Host computers 10000 and 10001 are connected to a disk array system 10200 via LAN cables 10002 and 10003, respectively. Host computers accesses files stored in the disk array system.

(2) The disk array system and its management information are controlled by an administrator from management server 10100. It has CPU 10102 which executes Management Program 10105 in its memory 10101 to communicate with the administrator through a user interface 10103 and the disk array system through LAN port 10104. LAN port 10104 is connected to the disk array system via LAN cable 10106.

(3) Disk array system 10200 has LAN ports 10202, 10203 and 10204 to communicate with host computers and management server, respectively.

(4) It has 1st tier disk drives 10212-10214, e.g., FibreChannel disk drives, which provides high performance and high reliability and are accessed through disk controller 10210. It also has 2nd tier disk drives 10215-10217, e.g., SATA disk drives, which provides inexpensive large capacity and are accessed through disk controller 10211.

(5) CPU 10201 executes Storage System Control Program 10206 in memory 10205. Storage System Control Program processes I/O requests sent from host computers, manages placement of files, and communicates with the management console.

(6) In memory 10205, there are Disk Volume Table 10207 which stores information about disk volumes, Client Table 10208 which stores information about each client and storage tier assigned to it, File Table 10209 which stores placement information of files, and Migration Rule Table 10218 which stores information about how file migration between tiers happens. These tables are managed by an administrator from the management server 10100.

(A) As shown in FIG. 2, for each disk volume 20001 in the storage system, Volume Table contains tier 20002, which the volume is categorized to, as well as list of free blocks in the volume 20003, which are not used to store any file, directory and management information. For example, if the tier of a disk volume is 1, the disk volume consists of 1st tier disk drives.

Figure 3:
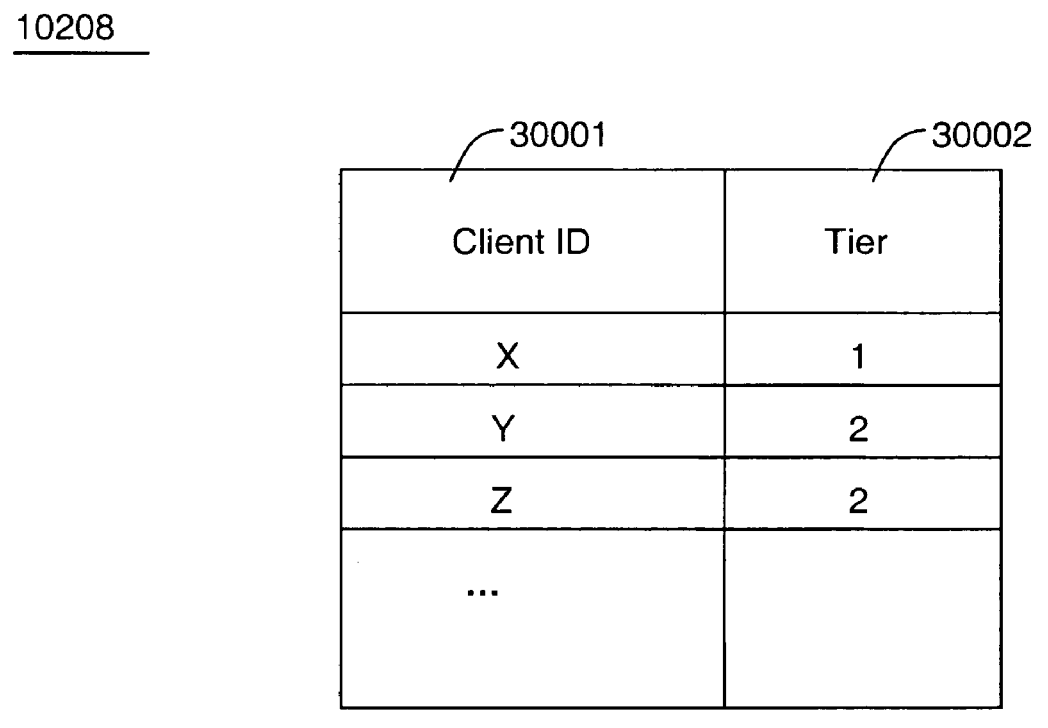

(B) As shown in FIG. 3, for each client of the storage system, Client Table contains ID 30001 of the client and a tier 30002, which is assigned to it. Client ID is obtained by clients in the standard file access protocol. For example, IP address can be used as ID to distinguish client host computers. Another example is UID which distinguish application programs in the client computers. Yet another example is client certificate which can be transferred from client to the storage system in WebDAV protocol.

(C) As shown in FIG. 4, for each file (or directory), File Table 10209 contains path of the file 40001, name of the file 40002, standard attributes 40003, like access time and access permissions, tier 40004, in which the file is stored currently, a list of used blocks 40005 to store the file. Name of directory is '.'. For example, directory '/dirA' has a path name of '/dirA' and file name '.' as shown in line 2. Used block is expressed by the combination of volume and LBA in the volume.

(D) As shown in FIG. 5, for each standard file access operation 50001, a migration rule 50002 is defined. File access operation is a command sent from clients. For example, a list of NFS operations like CREATE, WRITE, MKDIR, etc. is defined in RFC1813. Rule is one of CLIENT, CONSTANT (tier), UNCHANGE, UPPER, or LOWER. The meaning of each rule is following:

(a) CLIENT means the file to be accessed should be placed in a tier assigned to the client which is accessing the file.

(b) CONSTANT (tier) means the file should be placed in the specified tier. For example, CONSTANT (2) means the file should be placed in the 2nd tier.

(c) UNCHANGE means the file should remain in the tier which the file is placed in currently.

(d) UPPER means, if the current tier of the file is lower than the tier assigned to the client, the file should be migrated to the client's tier. For example, if the current tier is 2nd and the client's tier is 1st, the file will be migrated.

(e) LOWER means, if the current tier of the file is higher than the tier assigned to the client, the file should be migrated to the client's tier. For example, if the current tier is 1st and the client's tier is 2nd, the file will be migrated.

2. Management of the File Placement

Figure 6:
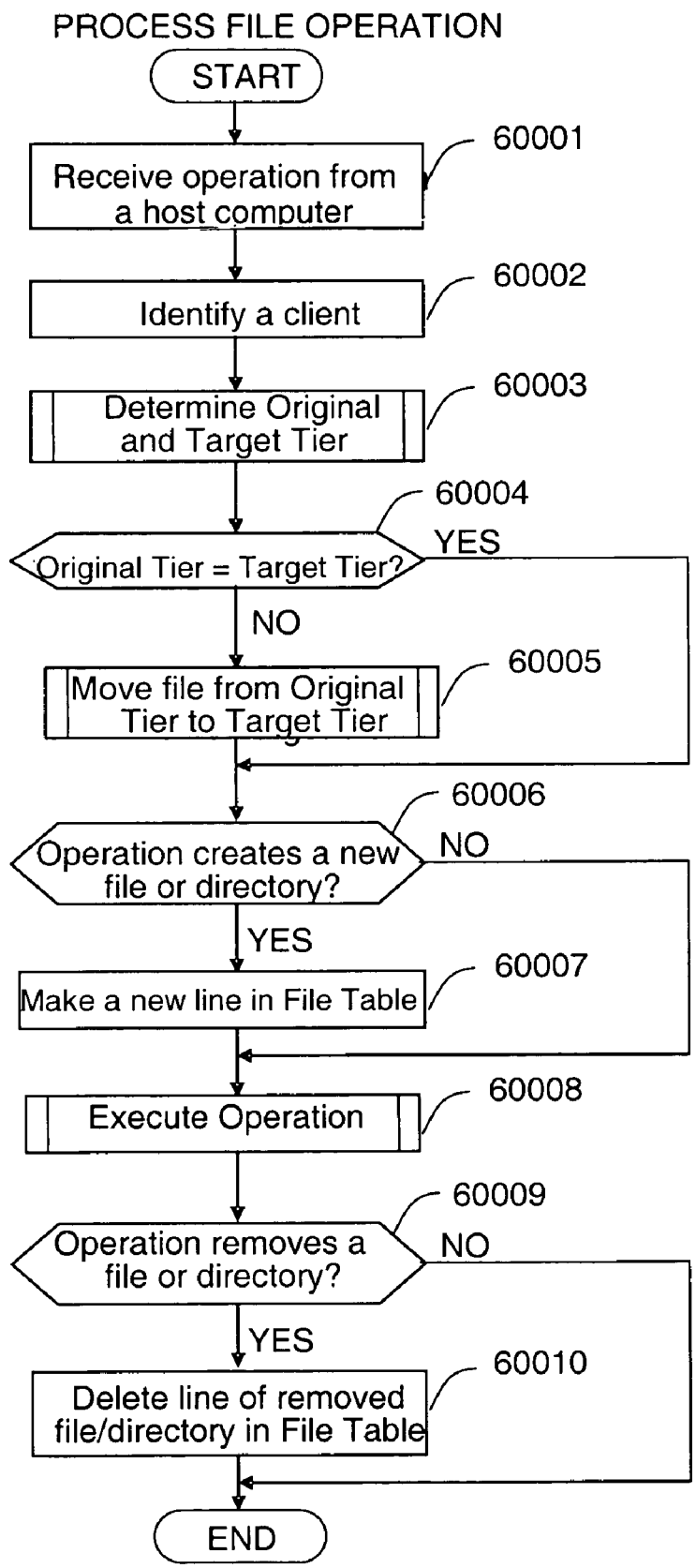
FIG. 6 shows the process flow of Storage System Control Program processing file access operations received from clients and managing the placement of files.

FIG. 6 shows the process flow of Storage System Control Program to process received file access operation from clients and manage the placement of the file. If the Storage System Control Program receives an operation from a host computer (step 60001), it retrieves an ID of the client to identify who is accessing the file (step 60002). Then, it determines an original tier which the file is stored in and target tier which the file should be migrated to by processing the operation (step 60003). The detail of 60003 is shown later. If the original and target tiers are different (step 60004), the file is moved from original tier to target tier (step 60005). The detail of 60005 is shown later.

In step 60006, Storage System Control Program investigates the received operation and judges whether it will create a new file or directory (step 60006). If it will, Storage System Control Program creates a new line in File Table (step 60007) and fills path, name, attributes which are retrieved from the operation. Tier is set to the target tier which is determined in step 60003. At this point, a list of used blocks is empty.

Figure 9:
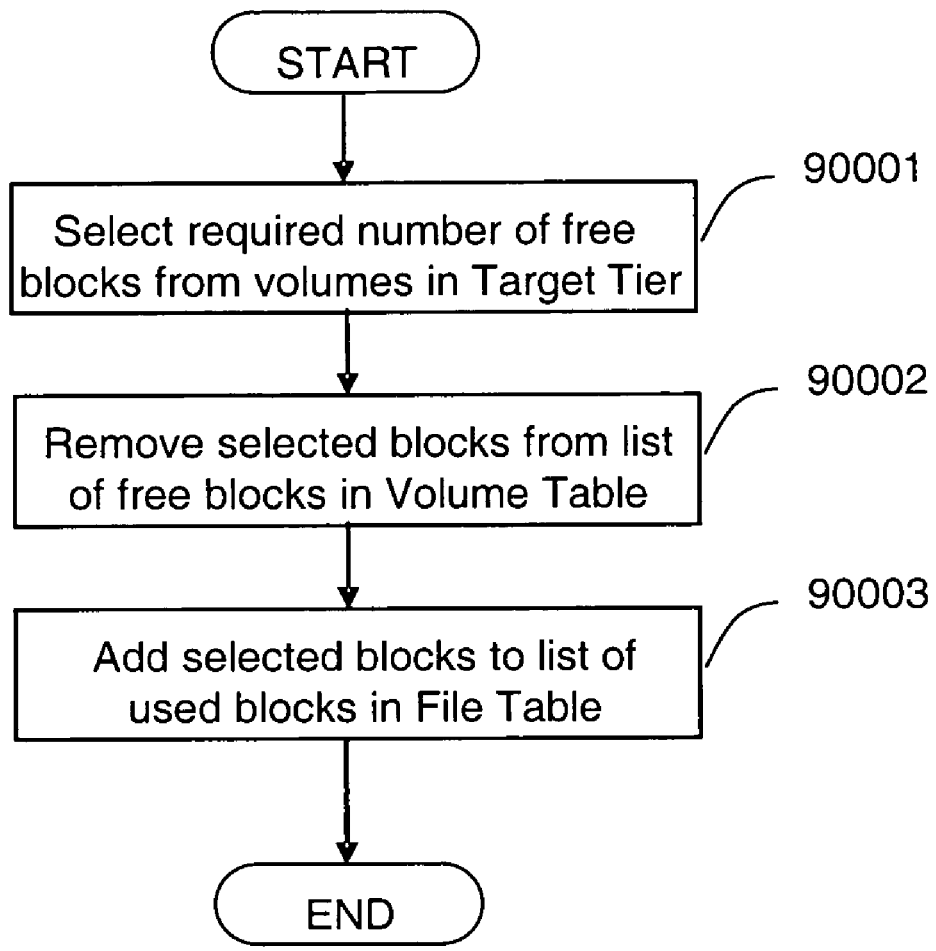
FIG. 9 illustrates in detail the process for assigning new blocks.
Figure 10:
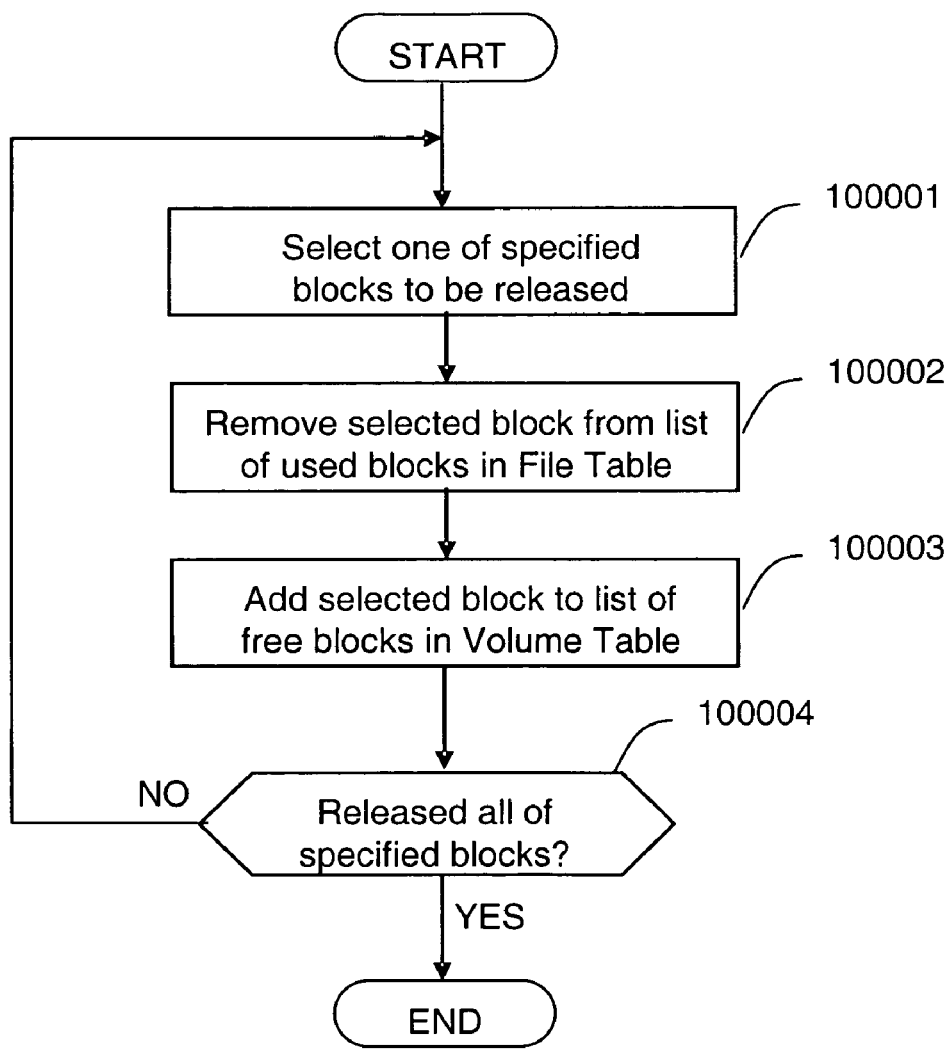
FIG. 10 illustrates in detail the process for releasing used blocks.

In step 60008, the operation is executed. The details of the operation are well-known in the art and not described herein. However, there is an exception related to managing the block assignment and the behavior is described later (FIGS. 9 and 10). Unlike steps 60006-60007, in steps 60009-600010, the Storage System Control Program removes a record corresponding to a file, if the file is removed by the operation.

Figure 7:
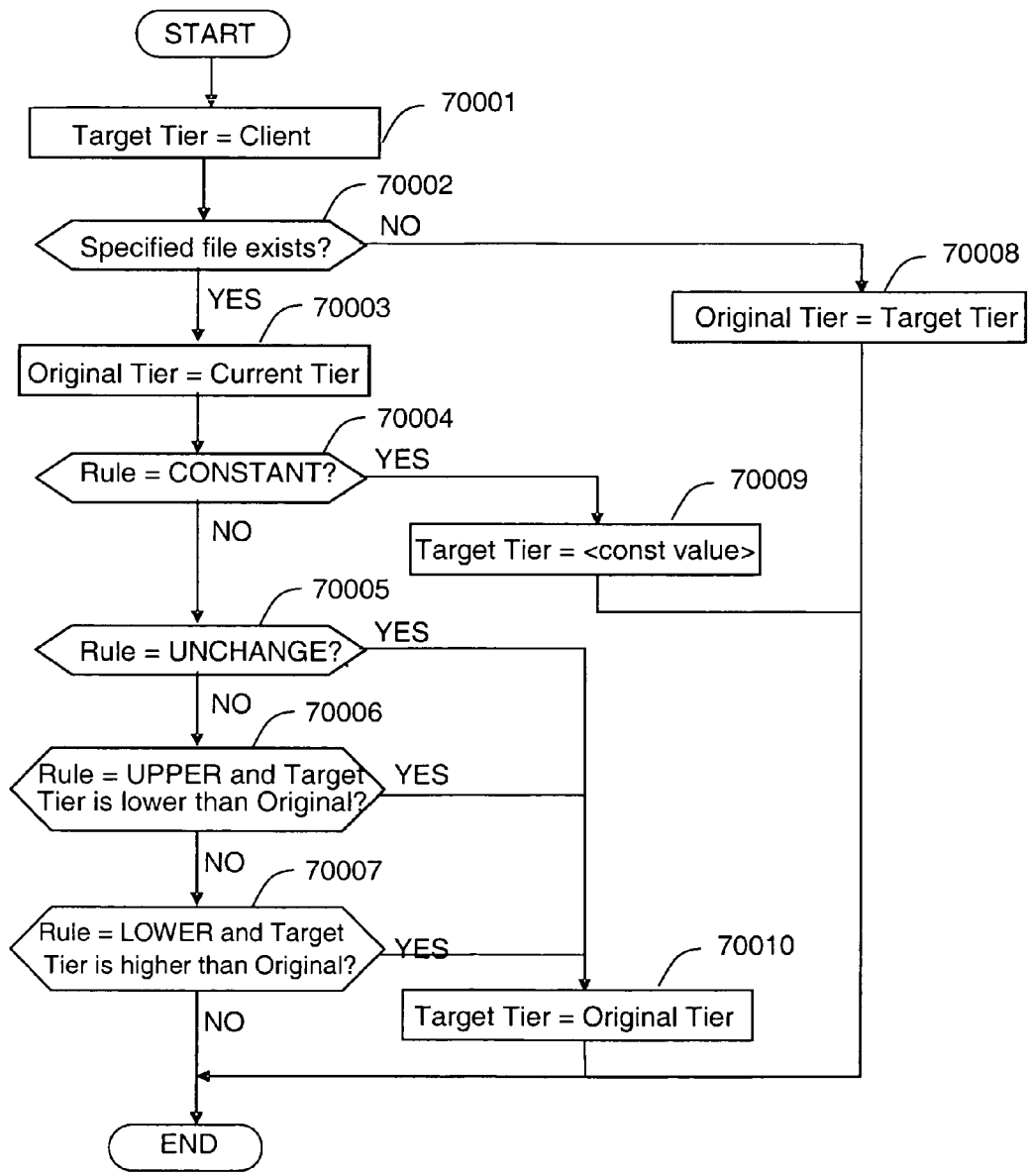
FIG. 7 illustrates in detail the process for determining the original and target tier.

FIG. 7 illustrates the details of the aforesaid step 60003. In this procedure, original and target tier of the file being accessed are determined. At first, in step 70001, target tier is set to the tier assigned to the client who sent the file access operation. If the file does not exist (step 70002), there is no original tier and it is set to the same tier of target tier so that no migration will happen (step 70008). Otherwise, original tier is set to current tier stored in File Table (step 70003). If a migration rule of the operation is CONSTANT, as determined in step 70004, the target tier is set to the constant value (step 70009). If the rule is UNCHANGE (step 70005), target tier is set to the same tier of original tier and no migration will happen (step 70010). If the rule is UPPER and target tier is lower than original tier (step 70006), the file should not be migrated to the target tier. So, the target tier is modified to the same tier of original tier (step 70010). Same is applied to the case of step 70007 in which the rule is LOWER and target tie is higher than original tier. If the rule is none of CONSTANT, UNCHANGE, UPPER, or LOWER, the rule must be CLIENT and target tier remains the value determined in step 70001. By the process described in FIG. 7, target tier is appropriately set based on the file access operation and its migration rule.

Figure 8:
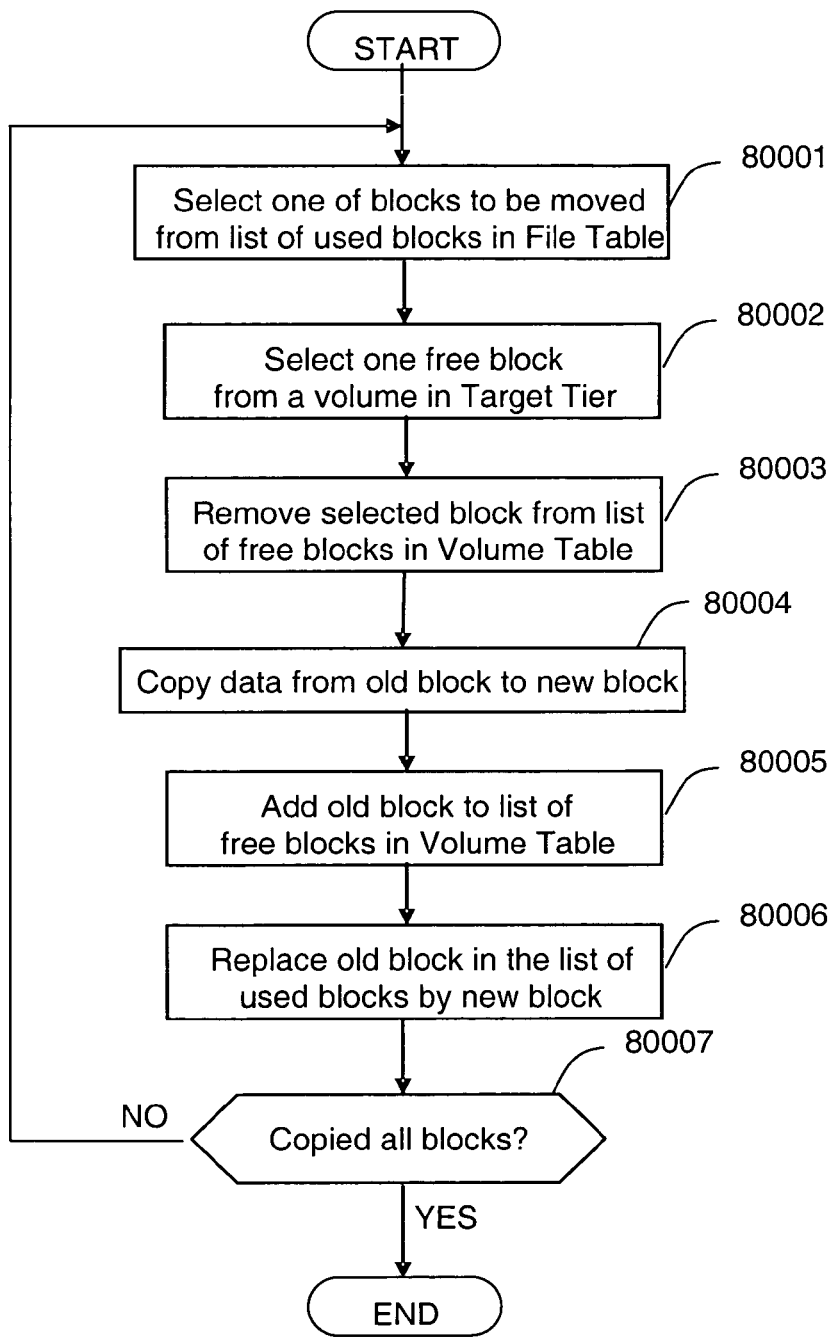
FIG. 8 illustrates in detail the process for moving a file from original to target tier.

FIG. 8 shows detail of step 60005. In this procedure, an existing file is migrated from original tier to target tier. In step 80001, Storage System Control Program selects one of blocks of the file to be migrated from a list of used blocks in File Table. Next, it looks up Volume Table and selects one free block from a disk volume whose tier is equal to target tier (step 80002) and removes the block from a list of free blocks of the disk volume in Volume Table (step 80003). In step 80004, it copies data from old block (the block selected in step 80001) to new block (the block selected in step 80002) and return the old block to a list of free blocks in Volume Table because it is released (step 80005). Finally, it replaces old block in the list of used blocks in File Table by new block (step 80006). These steps are repeated from each block in the list of used blocks of the file (step 80007).

FIGS. 9 and 10 show the procedures of assigning new blocks and releasing used blocks which may be required in step 60008. In FIG. 9, Storage System Control Program selects required number of free blocks from volumes in target tier (step 90001) and removes them from the list of free blocks (step 90002). After that, it adds them to a list of used blocks of the file in File Table (step 90003). In FIG. 10, to release specified blocks from a file/directory, Storage System Control Program selects one of the blocks to be released (step 100001) and remove the block from a list of used blocks of the file in File Table (step 100002). After that, it adds selected block to a list of free blocks in Volume Table (step 100003). These steps are repeated for each block to be released (step 100004).

In this embodiment, File Table is maintained in memory 10205. However, it can also be stored in disk drives. In another implementation, it is maintained as a part of management information of file system, like i-nodes.

By using the means described above, the tier of file is automatically selected and changed based on information and operations obtained from clients via standard file access protocol so that an administrator easily manages the placement of files.

3. Description of Exemplary Computer Platform

Figure 11:
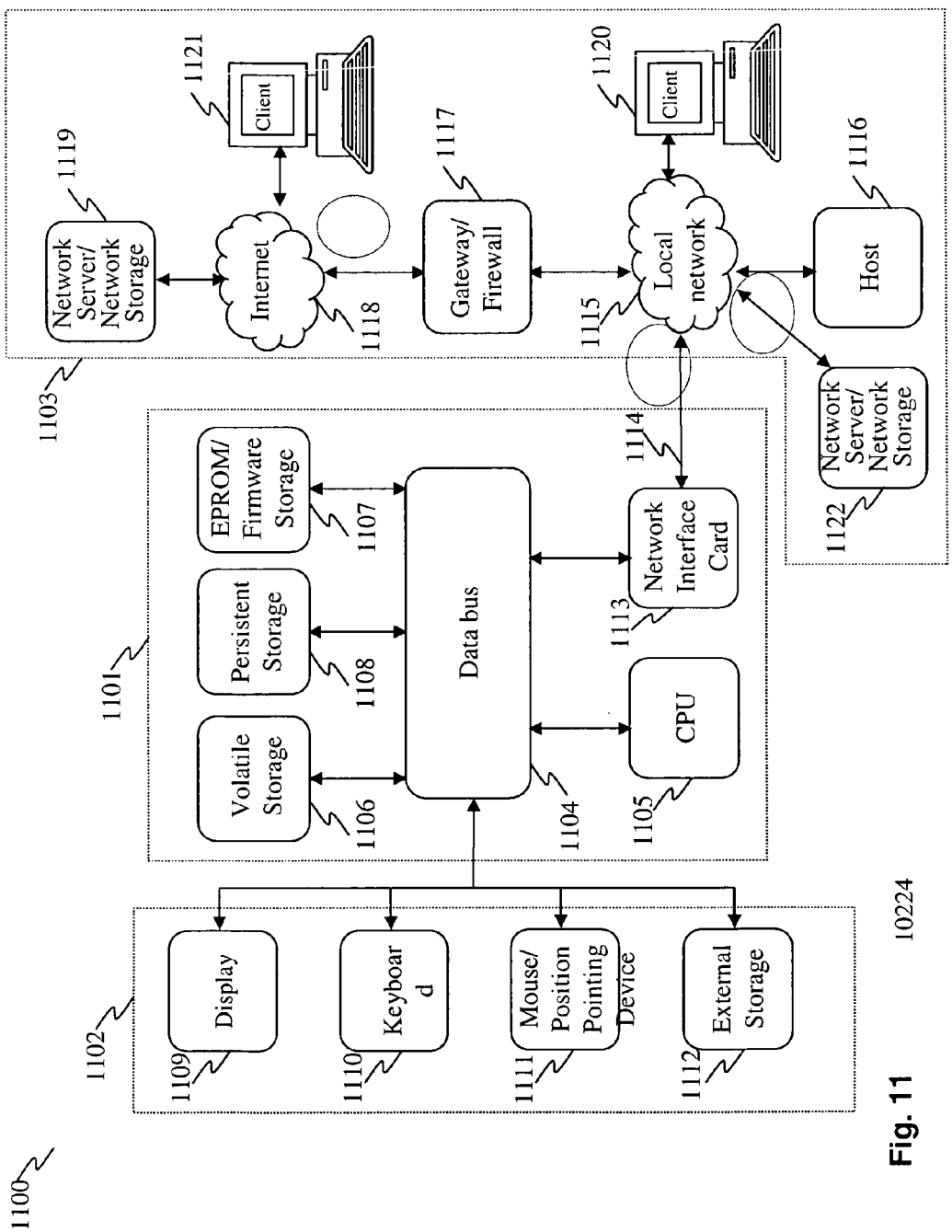
FIG. 11 illustrates an exemplary embodiment of a computer platform upon which the inventive system may be implemented.

FIG. 11 is a block diagram that illustrates an embodiment of a computer/server system 1100 upon which an embodiment of the inventive methodology may be implemented. The system 1100 includes a computer/server platform 1101, peripheral devices 1102 and network resources 1103.

The computer platform 1101 may include a data bus 1104 or other communication mechanism for communicating information across and among various parts of the computer platform 1101, and a processor 1105 coupled with bus 1101 for processing information and performing other computational and control tasks. Computer platform 1101 also includes a volatile storage 1106, such as a random access memory (RAM) or other dynamic storage device, coupled to bus 1104 for storing various information as well as instructions to be executed by processor 1105. The volatile storage 1106 also may be used for storing temporary variables or other intermediate information during execution of instructions by processor 1105. Computer platform 1101 may further include a read only memory (ROM or EPROM) 1107 or other static storage device coupled to bus 1104 for storing static information and instructions for processor 1105, such as basic input-output system (BIOS), as well as various system configuration parameters. A persistent storage device 1108, such as a magnetic disk, optical disk, or solid-state flash memory device is provided and coupled to bus 1101 for storing information and instructions.

Computer platform 1101 may be coupled via bus 1104 to a display 1109, such as a cathode ray tube (CRT), plasma display, or a liquid crystal display (LCD), for displaying information to a system administrator or user of the computer platform 1101. An input device 1110, including alphanumeric and other keys, is coupled to bus 1101 for communicating information and command selections to processor 1105. Another type of user input device is cursor control device 1111, such as a mouse, a trackball, or cursor direction keys for communicating direction information and command selections to processor 1104 and for controlling cursor movement on display 1109. This input device typically has two degrees of freedom in two axes, a first axis (e.g., x) and a second axis (e.g., y), that allows the device to specify positions in a plane.

An external storage device 1112 may be connected to the computer platform 1101 via bus 1104 to provide an extra or removable storage capacity for the computer platform 1101. In an embodiment of the computer system 1100, the external removable storage device 1112 may be used to facilitate exchange of data with other computer systems.

The invention is related to the use of computer system 1100 for implementing the techniques described herein. In an embodiment, the inventive system may reside on a machine such as computer platform 1101. According to one embodiment of the invention, the techniques described herein are performed by computer system 1100 in response to processor 1105 executing one or more sequences of one or more instructions contained in the volatile memory 1106. Such instructions may be read into volatile memory 1106 from another computer-readable medium, such as persistent storage device 1108. Execution of the sequences of instructions contained in the volatile memory 1106 causes processor 1105 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1105 for execution. The computer-readable medium is just one example of a machine-readable medium, which may carry instructions for implementing any of the methods and/or techniques described herein. Such a medium may take many forms, including but not limited to, non-volatile media, and volatile media. Non-volatile media includes, for example, optical or magnetic disks, such as storage device 1108. Volatile media includes dynamic memory, such as volatile storage 1106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1105 for execution. For example, the instructions may initially be carried on a magnetic disk from a remote computer. Alternatively, a remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on the data bus 1104. The bus 1104 carries the data to the volatile storage 1106, from which processor 1105 retrieves and executes the instructions. The instructions received by the volatile memory 1106 may optionally be stored on persistent storage device 1108 either before or after execution by processor 1105. The instructions may also be downloaded into the computer platform 1101 via Internet using a variety of network data communication protocols well known in the art.

The computer platform 1101 also includes a communication interface, such as network interface card 1113 coupled to the data bus 1104. Communication interface 1113 provides a two-way data communication coupling to a network link 1114 that is connected to a local network 1115. For example, communication interface 1113 may be an integrated services digital network (ISDN) card or a modem to provide a data communication connection to a corresponding type of telephone line. As another example, communication interface 1113 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1113 sends and receives electrical, electromagnetic or optical signals that carry digital data streams representing various types of information.

Network link 1113 typically provides data communication through one or more networks to other network resources. For example, network link 1114 may provide a connection through local network 1115 to a host computer 1116, or a network storage/server 1117. Additionally or alternatively, the network link 1113 may connect through gateway/firewall 1117 to the wide-area or global network 1118, such as an Internet. Thus, the computer platform 1101 can access network resources located anywhere on the Internet 1118, such as a remote network storage/server 1119. On the other hand, the computer platform 1101 may also be accessed by clients located anywhere on the local area network 1115 and/or the Internet 1118. The network clients 1120 and 1121 may themselves be implemented based on the computer platform similar to the platform 1101.

Local network 1115 and the Internet 1118 both use electrical, electromagnetic or optical signals that carry digital data streams. The signals through the various networks and the signals on network link 1114 and through communication interface 1113, which carry the digital data to and from computer platform 1101, are exemplary forms of carrier waves transporting the information.

Computer platform 1101 can send messages and receive data, including program code, through the variety of network(s) including Internet 1118 and LAN 1115, network link 1114 and communication interface 1113. In the Internet example, when the system 1101 acts as a network server, it might transmit a requested code or data for an application program running on client(s) 1120 and/or 1121 through Internet 1118, gateway/firewall 1117, local area network 1115 and communication interface 1113. Similarly, it may receive code from other network resources.

The received code may be executed by processor 1105 as it is received, and/or stored in persistent or volatile storage devices 1108 and 1106, respectively, or other non-volatile storage for later execution. In this manner, computer system 1101 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system. It is intended that the specification and examples be considered as exemplary only, with a true scope and spirit of the invention being indicated by the following claims.

What is claimed is:

1. A computerized data storage system comprising:
   a plurality of storage volumes having multiple tiers, wherein tiers are set by characteristics of each storage volume;
   a communication interface operable to connect the computerized data storage system to at least one client requesting access to data in the storage system;
   a memory unit storing a volume table comprising an identifier for a volume and the tier information associated with the volume corresponding to the identifier, and a client table comprising client information and tier information associated with said client information; and
   a storage processor operable to:
      i. receive a data access request corresponding to a file from the at least one client;
      ii. determine the identity of the requesting client;
      iii. determine an original tier of the file;
      iv. determine a target tier to which the file should be migrated to, the determining a target tier being based on the identifier of the client and contents of said client table; and
      v. if the original tier and the target tier are different, migrate the file from the original tier to the target tier.

2. The computerized data storage system of claim 1, further comprising a memory unit operable to store a file table, wherein the storage processor is further operable to:
   a. investigate the received data access request and determine whether a new file or directory should be created;
   b. if it is determined that the new file or directory should be created, insert a new record into the file table.

3. The computerized data storage system of claim 2, wherein the new record comprises path, name and attributes retrieved from the received data access request.

4. The computerized data storage system of claim 1, further comprising a memory unit operable to store a file table, wherein the storage processor is further operable to:
   a. investigate the received data access request and determine whether the file or a directory should be removed;
   b. if it is determined that the file or the directory should be removed, remove a corresponding record from the file table.

5. The computerized data storage system of claim 1, further comprising a memory unit operable to store a volume table comprising tier information for each volume of the first tier storage device and the second tier storage device.

6. The computerized data storage system of claim 1, wherein the storage processor is operable to migrate the file from the original tier to the target tier by:
   i. Selecting one of blocks to be moved from a list of used blocks;
   ii. Selecting one free block from a volume in the target tier;
   iii. Removing the selected free block from a list of free blocks;
   iv. Copying data from the selected used block to the selected free block;
   v. Adding the selected used block to the list of free blocks;
   vi. Replacing the selected used block in the list of used blocks by the selected free block; and
   vii. Repeating i. through vi. for all remaining blocks to be moved.

7. The computerized data storage system of claim 1, wherein the storage processor is operable to determine the target tier based on the identity of the requesting client and a type of the data access request.

8. A computerized data storage system comprising:
   a plurality of storage volumes having multiple tiers, wherein tiers are set by characteristics of each storage volume;
   a communication interface operable to connect the computerized data storage system to at least one client requesting access to data in the storage system;
   a storage processor operable to:
      i. receive a data access request corresponding to a file from the at least one client;
      ii. determine the identity of the requesting client;
      iii. determine an original tier of the file;
      iv. determine a target tier to which the file should be migrated to, the determining a target tier being based on client identity and contents of a client table; and
      v. if the original tier and the target tier are different, migrate the file from the original tier to the target tier; and
   a memory unit storing migration rule information for each file access request, and wherein said storage processor determines said target tier based on said migration rule information;
   wherein the memory unit further stores a volume table comprising an identifier for a volume and the tier information associated with the volume corresponding to the identifier; and
   wherein the memory unit further stores the client table, the client table comprising the client identity and tier information associated with the client information.

9. The computerized data storage system of claim 8, wherein the migration rule information comprises CLIENT rule indicating that the file should be placed in a tier corresponding to the requesting client.

10. The computerized data storage system of claim 8, wherein the migration rule information comprises CONSTANT rule indicating that the file should be placed in a predetermined tier.

11. The computerized data storage system of claim 8, wherein the migration rule information comprises UNCHANGE rule indicating that the file should remain in a current tier.

12. The computerized data storage system of claim 8, wherein the migration rule information comprises UPPER rule indicating that if the tier of the file is lower than a tier of the requesting client, the file should be migrated to the tier of the requesting client.

13. The computerized data storage system of claim 8, wherein the migration rule information comprises LOWER rule indicating that if the tier of the file is higher than a tier of the requesting client, the file should be migrated to the tier of the requesting client.

14. The computerized data storage system of claim 8, wherein the storage processor is operable to determine the target tier using the migration rule information.

15. The computerized data storage system of claim 14, wherein the storage processor is operable to read the migration rule information corresponding to the data access request from the memory unit and if the migration rule information corresponds to a CLIENT rule, place the file in a tier corresponding to the requesting client.

16. The computerized data storage system of claim 14, wherein the storage processor is operable to read the migration rule information corresponding to the data access request from the memory unit and if the migration rule information corresponds to a CONSTANT rule, place the file in a predetermined tier.

17. The computerized data storage system of claim 14, wherein the storage processor is operable to read the migration rule information corresponding to the data access request from the memory unit and if the migration rule information corresponds to a UNCHANGE rule, leave the file in a current tier.

18. The computerized data storage system of claim 14, wherein the storage processor is operable to read the migration rule information corresponding to the data access request from the memory unit and if the migration rule information corresponds to an UPPER rule and the tier of the file is lower than a tier of the requesting client, placing the file in the tier of the requesting client.

19. The computerized data storage system of claim 14, wherein the storage processor is operable to read the migration rule information corresponding to the data access request from the memory unit and if the migration rule information corresponds to a LOWER rule and the tier of the file is higher than a tier of the requesting client, placing the file in the tier of the requesting client.

* * * * *